(12) United States Patent
Wesner et al.

(10) Patent No.: US 9,093,729 B2
(45) Date of Patent: Jul. 28, 2015

(54) HEAT EXCHANGER

(75) Inventors: Markus Wesner, Stuttgart (DE);
Hans-Georg Herrmann, Stuttgart (DE);
Peter Klein, Stuttgart (DE); Thomas Himmer, Reichenbach (DE)

(73) Assignee: MAHLE BEHR GMBH & CO. KG, Stuttgart (DE)

( * ) Notice: Subject to any disclaimer, the term of this patent is extended or adjusted under 35 U.S.C. 154(b) by 0 days.

(21) Appl. No.: 13/979,473

(22) PCT Filed: Jan. 13, 2012

(86) PCT No.: PCT/EP2012/050529
§ 371 (c)(1),
(2), (4) Date: Oct. 1, 2013

(87) PCT Pub. No.: WO2012/095531
PCT Pub. Date: Jul. 19, 2012

(65) Prior Publication Data
US 2014/0013787 A1    Jan. 16, 2014

(30) Foreign Application Priority Data
Jan. 14, 2011    (DE) ........................ 10 2011 008 653

(51) Int. Cl.
*F28F 27/02*      (2006.01)
*H01M 10/613*    (2014.01)
(Continued)

(52) U.S. Cl.
CPC ............. *H01M 10/5004* (2013.01); *B60H 1/00* (2013.01); *B60H 1/3229* (2013.01); *F25B 39/022* (2013.01); *F28D 9/005* (2013.01);
(Continued)

(58) Field of Classification Search
CPC .................. B60H 1/00278; F25B 39/022
USPC .............. 62/524–526; 429/120; 165/166–167
See application file for complete search history.

(56) References Cited

U.S. PATENT DOCUMENTS 3,605,881 A *  9/1971  Doi .............................. 165/167
6,705,101 B2 *  3/2004  Brotz et al. ..................... 62/198
(Continued)

FOREIGN PATENT DOCUMENTS

DE          30 21 246 A1    12/1980
DE          30 20 557 A1    12/1981
(Continued)

OTHER PUBLICATIONS

International Search Report, PCT/EP2012/050529, May 7, 2012, 3 pgs.
(Continued)

*Primary Examiner* — Cassey D Bauer
(74) *Attorney, Agent, or Firm* — Paul D. Strain, Esq.; Strain & Strain PLLC

(57) ABSTRACT

Disclosed herein is a plate-type heat exchanger or chiller, with multiple stacking plates stacked one on top of the other such that a first fluid duct for a first fluid and a second fluid duct for a second fluid are formed between the stacking plates. A first inlet and outlet opening for conducting in and discharging the first fluid, and a second inlet and outlet opening for conducting in and discharging the second fluid is provided. The first inlet or outlet opening is formed by an immersion pipe and the first fluid can be conducted into the first fluid duct through the immersion pipe, such that the first inlet and outlet openings are formed on the same side of the heat exchanger.

15 Claims, 5 Drawing Sheets

Figure 1:
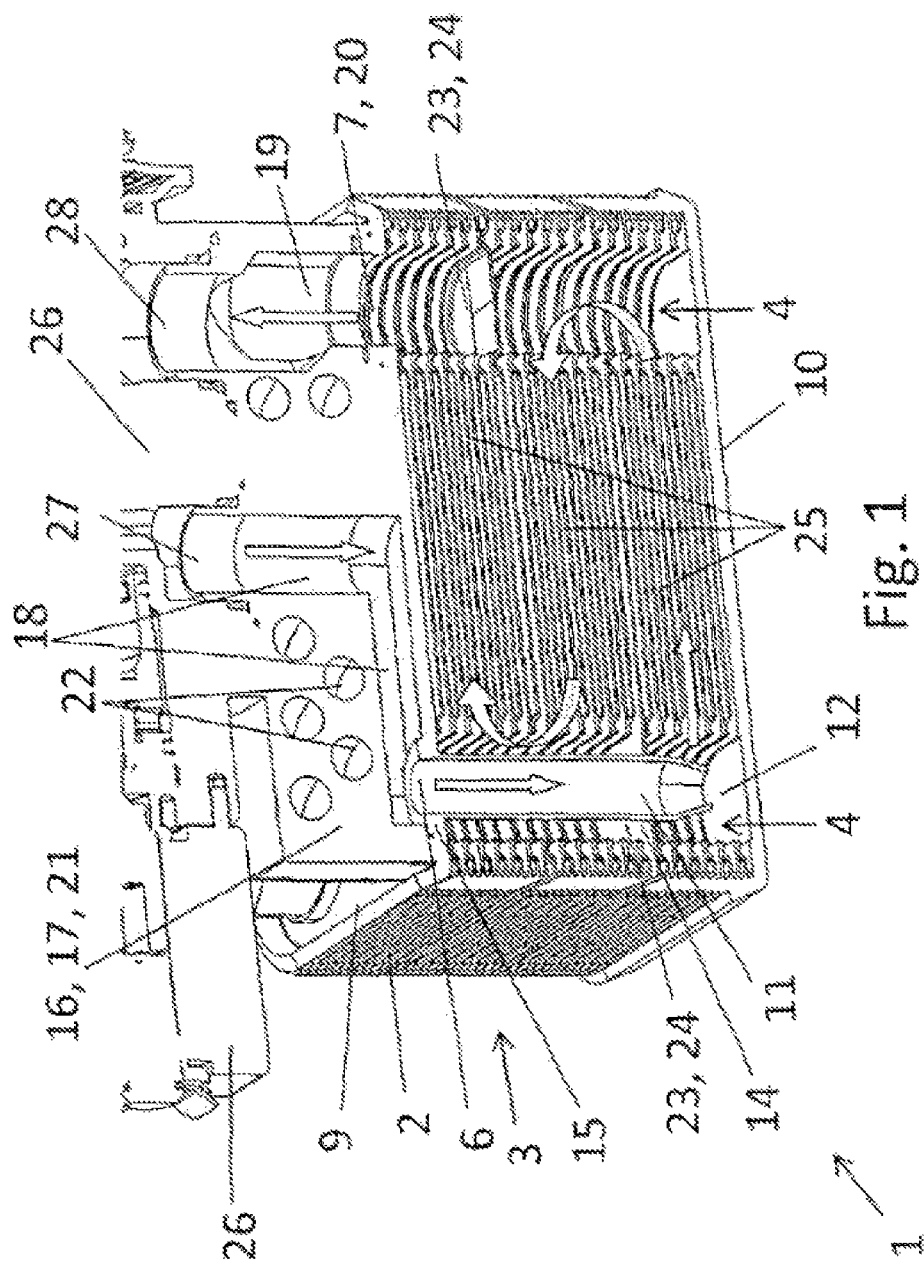

(51) Int. Cl.
*B60H 1/00* (2006.01)
*B60H 1/32* (2006.01)
*F25B 39/02* (2006.01)
*F28D 9/00* (2006.01)
*F28F 9/02* (2006.01)
*H01M 10/60* (2014.01)
*H01M 10/625* (2014.01)
*H01M 10/663* (2014.01)
*F28D 1/03* (2006.01)

(52) U.S. Cl.
CPC ............ *F28F 9/0268* (2013.01); *H01M 10/50* (2013.01); *H01M 10/5016* (2013.01); *H01M 10/5095* (2013.01); *H01M 10/60* (2015.04); *H01M 10/613* (2015.04); *H01M 10/625* (2015.04); *H01M 10/663* (2015.04); *F28D 1/0325* (2013.01); *F28F 27/02* (2013.01)

(56) References Cited

U.S. PATENT DOCUMENTS 6,814,133 B2  11/2004  Yamaguchi
2002/0129926 A1  9/2002  Yamaguchi
2002/0184908 A1  12/2002  Brotz et al.
2010/0243200 A1  9/2010  Baker, Jr. et al.

FOREIGN PATENT DOCUMENTS

| | | |
|---|---|---|
| DE | 38 24 074 A1 | 1/1990 |
| DE | 195 234 75 C1 | 11/1996 |
| DE | 197 125 99 A1 | 10/1998 |
| DE | 101 28 164 A1 | 12/2002 |
| DE | 10 2008 017 113 A1 | 10/2009 |
| DE | 10 2010 012 869 A1 | 9/2010 |
| EP | 1 850 082 A1 | 10/2007 |
| EP | 2 107 328 A1 | 10/2009 |
| FR | 2 634 276 A1 | 1/1990 |
| FR | 2 870 588 A1 | 11/2005 |

OTHER PUBLICATIONS

German Search Report, DE 10 2011 008 653.6, Aug. 19, 2011, 8 pgs.

Chinese Office Action and English translation thereof, Appl. No. 201280005306.5, Dec. 18, 2014, 14 pgs.

* cited by examiner

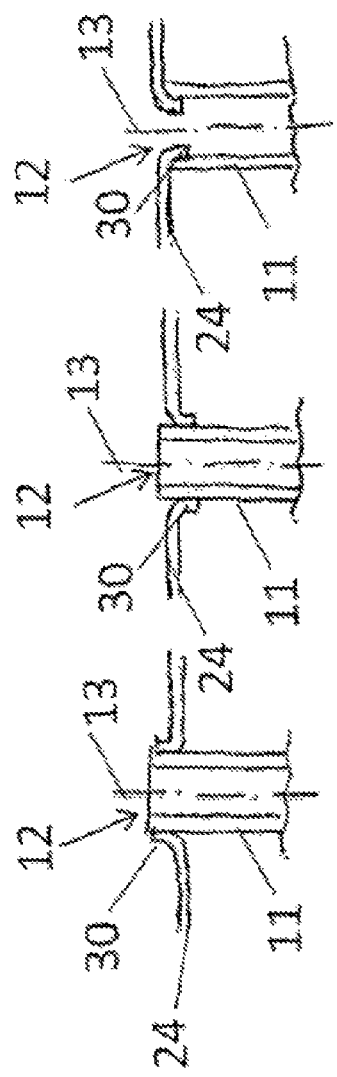
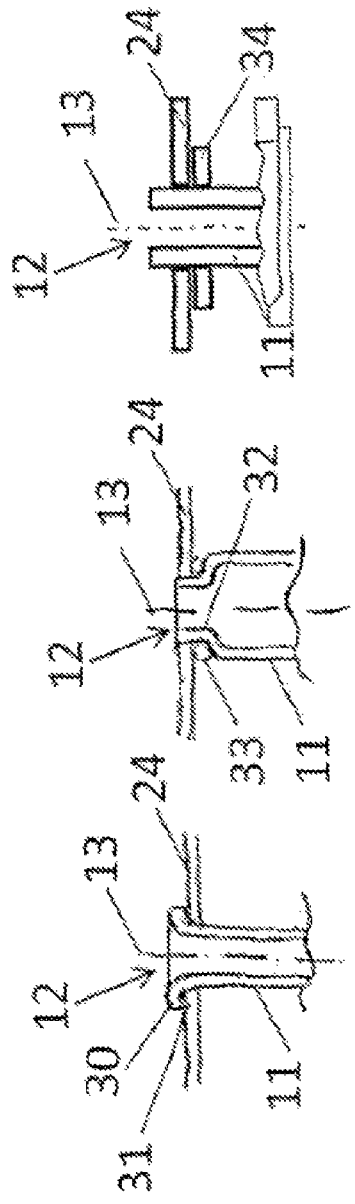

HEAT EXCHANGER

CROSS-REFERENCE TO RELATED PATENT APPLICATIONS

This application is a National Stage of International Application No. PCT/EP2012/050529, filed Jan. 13, 2012, which is based upon and claims the benefit of priority from prior German Patent Application No. 10 2011 008 653.6, filed Jan. 14, 2011, the entire contents of all of which are incorporated herein by reference in their entirety.

The invention relates to a heat exchanger as per the preamble of claim 1, to a system for a motor vehicle for heating and/or cooling a battery as per the preamble of claim 14, and to a motor vehicle air conditioning system as per the preamble of claim 15.

Batteries of hybrid or electric vehicles must be heated or cooled in order to attain an adequate operating temperature of the battery, for example in a temperature range between 0° C. and 40° C. When electrical energy is extracted from the battery or the battery is being charged, the battery generates heat, such that the battery must be cooled in order that it is not heated to temperatures of higher than 30° C. or 40° C. In the case of low outside temperatures, which may for example lie below 0° C., heating of the battery is necessary in order that electrical energy can be extracted from the battery and charging with electrical energy is also possible. For this purpose, the hybrid or electric vehicle has a coolant circuit by means of which the battery can be cooled and preferably heated.

DE 101 28 164 A1 presents a vehicle cooling system for an electric or hybrid vehicle. The vehicle cooling system has a coolant circuit which is thermally coupled to a battery. Also installed in the coolant circuit with the battery is an evaporator of a refrigerant circuit having a condenser, a compressor and an expansion valve. The coolant circuit with the battery can be cooled by means of the evaporator, such that in this way the battery can also be cooled by means of the refrigerant circuit. It is also known, in a vehicle cooling system of said type, for the coolant circuit for the battery to be coupled to an ambient-air heat exchanger, such that in the case of low outside temperatures, the battery can be cooled by means of the dissipation of heat to the ambient air, without the refrigerant circuit being in operation.

DE 10 2008 017 113 A1 discloses an evaporator as a heat exchanger for a motor vehicle. A multiplicity of panels are stacked parallel to one another in a vertical direction so as to form a heat exchanger of panel-type or plate-type construction. Between the panels there is formed a first flow chamber for refrigerant as a first fluid and a second flow chamber for a second fluid, such that heat can be transmitted from the second fluid to the refrigerant.

DE 195 23 475 C1 presents a panel-type heat exchanger, in particular oil cooler with a stack of heat exchanger panels which, so as to form separate flow ducts for the heat-exchanging media, lie one inside the other and are connected to one another by joining technology and wherein the inlet and outlet apertures for at least one medium are situated on the same side of the panel stack, with inserts being provided in the inflow and outflow ducts for the purpose of diverting the flow in a meandering configuration, wherein one insert substantially blocks one inlet and outflow duct and the other insert lines the other inflow or outflow duct in regions in the manner of a sleeve, wherein the inserts are produced as individual injection-molded parts which are connected by a connecting part, and wherein the inserts are detachably fastened in the inflow duct and in the outflow duct.

EP 2 107 328 A1 presents an evaporator, in particular for a motor vehicle, comprising a multiplicity of panels which are stacked parallel to one another in a vertical direction and which have apertures, arranged in alignment, for the supply and discharge of a first fluid in the form of a refrigerant and a second fluid, wherein, between two adjacent panels, a flow duct of a first type for conducting the first fluid and a flow duct of a second type for conducting the second fluid are formed in an alternating manner, wherein a heat-exchanging surface of the panels has a length in the flow direction of the refrigerant and a width perpendicular thereto, wherein the ratio of the length to the width is no greater than approximately 1.3.

Heat exchangers or chillers of plate-type construction are used in systems in order to cool the batteries of hybrid or electric vehicles by means of a refrigerant circuit. Here, the heat exchanger or chiller is of plate-type construction and comprises a multiplicity of stacking plates stacked one on top of the other, such that between the stacking plates there is formed a first fluid duct for the refrigerant and a second fluid duct for the coolant, for example water with an antifreeze agent. Here, the refrigerant is conducted in opposite directions, that is to say in a meandering fashion, through the first fluid duct between the stacking plates through at least two, preferably at least three portions of the first fluid duct between the stacking plates. In this way, the first inlet opening and the first outlet opening for the refrigerant are formed on different, opposite sides of the heat exchanger, for example the inlet opening on the cover panel and the outlet opening on a base panel. Such heat exchangers are furthermore provided with a thermal expansion valve. The thermal expansion valve controls the throughflow rate of the refrigerant introduced into the heat exchanger as a function of the temperature of the refrigerant flowing out of the heat exchanger, for example by virtue of the flow cross-sectional area of an inflow duct at the expansion valve being controlled as a function of the temperature at which the refrigerant flows out of the heat exchanger. The thermal expansion valve thus requires both an inflow duct, the flow cross-sectional area of which is preferably variable, and an outflow duct through which the refrigerant conducted out of the heat exchanger is conducted in order that the thermal expansion valve can detect the temperature of the refrigerant flowing out of the heat exchanger at the outflow duct of the expansion valve. If the inlet and outlet openings for the refrigerant are formed on two opposite sides of the heat exchanger, it is necessary in a cumbersome manner by means of a tube for the refrigerant emerging from the outlet opening to be conducted to the thermal expansion valve if the thermal expansion valve is formed for example in the region of the inlet opening or of the cover panel. As a result, the heat exchanger or evaporator with the thermal expansion valve requires a large installation space owing to the tube for conducting the refrigerant from one side of the heat exchanger to another side of the heat exchanger with the thermal expansion valve. Furthermore, the production of the heat exchanger with the thermal expansion valve involves high costs.

It is therefore the object of the present invention to provide a heat exchanger, a system for a motor vehicle for heating and/or cooling a battery, and a vehicle air conditioning system, in the case of which the heat exchanger has a small installation space requirement and is simple and inexpensive to produce.

Said object is achieved by means of a heat exchanger or chiller of plate-type construction, comprising a multiplicity of stacking plates stacked one on top of the other, such that between the stacking plates there is formed a first fluid duct for a first fluid and a second fluid duct for a second fluid, the stacking plates have first apertures as a first fluid duct for the supply and discharge of the first fluid, the stacking plates have second apertures as a second fluid duct for the supply and discharge of the second fluid, at least one diverting device which closes off at least one first apertures such that the first fluid is conducted in opposite directions through the heat exchanger in a meandering fashion through at least two, preferably at least three portions of the first fluid duct between the stacking plates, a first inlet and outlet opening for conducting the first fluid in and out, a second inlet and outlet opening for conducting the second fluid in and out, wherein the first inlet or outlet opening is formed by an immersion tube, and the first fluid can be conducted into the first fluid duct through the immersion tube such that the first inlet and outlet opening are formed on the same side of the heat exchanger.

The refrigerant is conducted in opposite directions through the heat exchanger or chiller in a meandering fashion through at least two, preferably at least three portions of the first fluid duct between the stacking plates. The first fluid in the first fluid duct between the stacking plates exhibits a high flow speed, for example because, in the case of a configuration with three portions, the sum of the flow cross-sectional areas of the first fluid duct between all of the stacking plates amounts to only one third of the sum of the flow cross-sectional areas of the first fluid duct between the stacking plates. In this way, it is possible with the heat exchanger, even with a small installation space, to permit a large exchange of heat from the first fluid to the second fluid, or conversely, owing to the high or higher flow speed of the first fluid. Here, the first inlet or outlet opening for the first fluid is formed by an immersion tube, such that the first inlet and outlet opening for the first fluid are formed on the same side of the heat exchanger, for example only on the cover panel or only on a base panel. It is thus advantageously not necessary, in the case of a thermal expansion valve being used or fitted on the heat exchanger, for the refrigerant flowing out of the heat exchanger to be conducted in a cumbersome manner by means of a tube from one side of the heat exchanger to another side of the heat exchanger with the thermal expansion valve. In this way, installation space can be saved, and the costs for the production of the heat exchanger can be reduced.

In an additional embodiment, the immersion tube is connected non-detachably, in particular cohesively, for example by means of a soldered or adhesive connection, to the heat exchanger, and/or the first fluid can, through the immersion tube, be conducted into the first fluid duct at a distance (from the inlet or outlet opening). Here, the distance is in relation only to the inlet or outlet opening formed by the immersion tube. It is preferable for the heat exchanger to be an evaporator and for the first fluid to be a refrigerant and for the inlet opening, but not the outlet opening, to be formed by the immersion tube. One end of the immersion tube forms the inlet or outlet opening for the first fluid, and the distance is the distance from the inlet or outlet opening to at least one flow opening on the immersion tube.

In a supplementary variant, the immersion tube extends through the at least one diverting device such that the first fluid conducted through the immersion tube can be conducted through the at least one diverting device.

In a further embodiment, the at least one diverting device is in the form of a diverting plate or a separate sealing element, for example sealing panel. A diverting plate is for example in the form of a stacking plate which has only one first aperture instead of two apertures, such that as a result, the first fluid in the chamber between the corresponding first apertures is diverted and thereby flows in opposite directions in a meandering fashion through the first fluid duct between the stacking plates. Here, a separate sealing element, for example a sealing panel or a sealing lip, closes off a first aperture of the stacking plate, such that as a result, a first aperture is closed off by means of an additional component on the stacking plate.

The at least one flow opening is formed in the region of, or at the other end of the immersion tube with respect to, a first end of the immersion tube with the first inlet or outlet opening.

In an additional variant, the at least one flow opening is formed radially and/or axially with respect to a longitudinal axis of the immersion tube.

The heat exchanger is expediently in the form of an evaporator with a preferably thermal expansion valve, and the first fluid is a refrigerant and the second fluid is a coolant, for example water or air.

In an additional embodiment, the thermal expansion valve has both an inflow duct for conducting the refrigerant in and an outflow duct for conducting the refrigerant out. The thermal expansion valve also preferably comprises a device for varying the flow cross-sectional area of the inflow duct as a function of the temperature of the refrigerant conducted through the outflow duct at the expansion valve.

In a supplementary embodiment, the expansion valve is fastened by way of a connecting flange to the remainder of the heat exchanger, and the connecting flange has both an inflow duct for conducting the refrigerant in and an outflow duct for conducting the refrigerant out.

In an additional embodiment, the expansion valve is fastened preferably directly, without a connecting flange, to the remainder of the heat exchanger, for example to a cover panel or to a base panel.

It is preferable for a connecting flange outlet opening and the outflow duct of the connecting flange to be formed in alignment with the first outlet opening on the remainder of the heat exchanger, and/or for the outflow duct on the connecting flange to exhibit substantially no diversion. Substantially no diversion means that the outflow duct has no bend or curve for diverting the refrigerant or the first fluid with a diversion of at least 20°, 10°, 5° or 2°. A diversion of the first fluid, in particular refrigerant, conducted out through the outflow duct of the connecting flange should be avoided in order to prevent an unnecessary pressure loss of the refrigerant flowing out.

In a supplementary variant, the immersion tube is fastened to the heat exchanger by means of a loose mounting and a fixed mounting, and at the loose mounting, the immersion tube is movable relative to the loose mounting in the direction of the longitudinal axis of the immersion tube, and the loose mounting is preferably formed by the diverting plate or by a cover panel. The heat exchanger or the stack of stacking plates is joined together cohesively by soldering during a soldering process in a soldering furnace. During this, a settling process of the stacking plates stacked one on top of the other occurs, such that as a result, the extent or size of the stack perpendicular to a plane spanned by the stacking plates decreases. During the soldering process, the immersion tube is also already arranged on the heat exchanger or within the stack, and is likewise cohesively connected to the heat exchanger at the fixed mounting. A loose mounting is necessary in order that the stack can perform the settling process during the soldering process. For example, the fixed mounting is formed on the cover panel, and the immersion tube is cohesively connected to the cover panel during the soldering process in the soldering furnace by means of a solder plating on the cover panel and on the immersion tube. By contrast to this, the loose mounting is formed for example on the diverting plate. The diverting plate has an opening through which the immersion tube is guided. Here, no solder plating is provided either on the immersion tube or on the diverting plate in the region of said opening, such that as a result, during the soldering process in the soldering furnace, no cohesive connection is formed between the immersion tube and the diverting plate, and thus a loose mounting between the immersion tube and the opening of the diverting plate is formed.

In a supplementary embodiment, the heat exchanger comprises a fixing device for the fastening of the heat exchanger, and the fixing device is preferably formed by the connecting flange. By contrast to this, the fixing device may also be in the form of an additional component supplementary to the connecting flange or the connecting block. For example, a fixing device of said type is cohesively fastened to the cover panel or to the base panel by soldering. Here, the fixing device, as a separate component or as a connecting flange, has at least one, preferably multiple bores, and into said bores there may be fastened fastening elements, for example screws or bolts, for fixing the heat exchanger to another component, for example to a bodyshell of a motor vehicle.

In an additional embodiment, the ratio between the flow cross-sectional area of the immersion tube and the flow cross-sectional area of a first aperture outside the immersion tube is between 0.1 and 0.6. If the heat exchanger is used as an evaporator, and thus if the first fluid is in the form of refrigerant, the immersion tube is preferably formed at the first inlet opening, such that the liquid refrigerant flows into the heat exchanger or evaporator through the immersion tube. The mass flow density in the immersion tube is thus high because the refrigerant has not yet evaporated. After the refrigerant is conducted out at at least one flow opening, the refrigerant evaporates as it is conducted through the first fluid duct, such that as it flows through a first aperture outside the immersion tube, the refrigerant has already at least partially evaporated, and thereby has a lower mass flow density. For this reason, it is necessary for the size of the flow cross-sectional area of the first aperture outside the immersion tube to be larger than the flow cross-sectional area of the immersion tube.

In a further embodiment, the components of the heat exchanger, in particular the immersion tube, the stacking plates, the cover panel, the base panel, the connecting flange and/or the expansion valve are composed at least partially, in particular entirely, of metal, in particular steel, iron or aluminum or of non-ferrous metal.

In a supplementary variant, the components of the heat exchanger are cohesively connected to one another, in particular by means of soldering.

The components of the heat exchanger expediently have a solder plating for the cohesive connection of the components of the heat exchanger by means of soldering in a soldering furnace.

In an additional embodiment, the cover panel and/or the base panel have a thickness greater, preferably a thickness at least 1.5, 2, 3 or 5 times greater, than that of the stacking plates.

In a further embodiment, the length of the immersion tube is smaller than the extent of the stack perpendicular to a plane spanned by the stacking plates.

The immersion tube is expediently of circular, elliptical, polygonal, for example triangular or tetragonal, in particular square, cross-sectional form.

In a further variant, the immersion tube has a flow cross-sectional area which varies in the longitudinal direction, for example with a deviation of greater than 5%, 10% or 20%.

In an additional embodiment, the sum of the flow cross-sectional area of the at least one flow opening of the immersion tube is smaller, preferably 5%, 10% or 20% smaller, than the flow cross-sectional area of the immersion tube. This leads to a micro-throttling action as the refrigerant flows out of the immersion tube, and thus to an improved distribution by atomization of the refrigerant as it emerges from the immersion tube.

System according to the invention for a motor vehicle for heating and/or cooling a battery and preferably a motor vehicle interior, comprising a coolant circuit for cooling the battery and preferably the vehicle interior, a refrigerant circuit having a condenser, a compressor, an expansion valve and preferably a first evaporator for cooling the vehicle interior and a second evaporator for cooling the battery, by virtue of the second evaporator being thermally coupled, as a heat exchanger, to the coolant circuit, and wherein the heat exchanger is in the form of a heat exchanger as described in this patent application.

The stacking plates of the heat exchanger are expediently arranged so as to form a block of stacking plates stacked one on top of the other.

In one variant, the stacking plates are arranged one on top of the other substantially in parallel, for example with a deviation of less than 10°, 5° or 2°.

The heat exchanger preferably comprises at least 5, 6, 10, 20, 30, 38, 50, 56 or 68 stacking plates.

A motor vehicle air conditioning system according to the invention comprises a system as described in this patent application, and/or the motor vehicle air conditioning system comprises a heat exchanger as described in this patent application.

Figure 2:
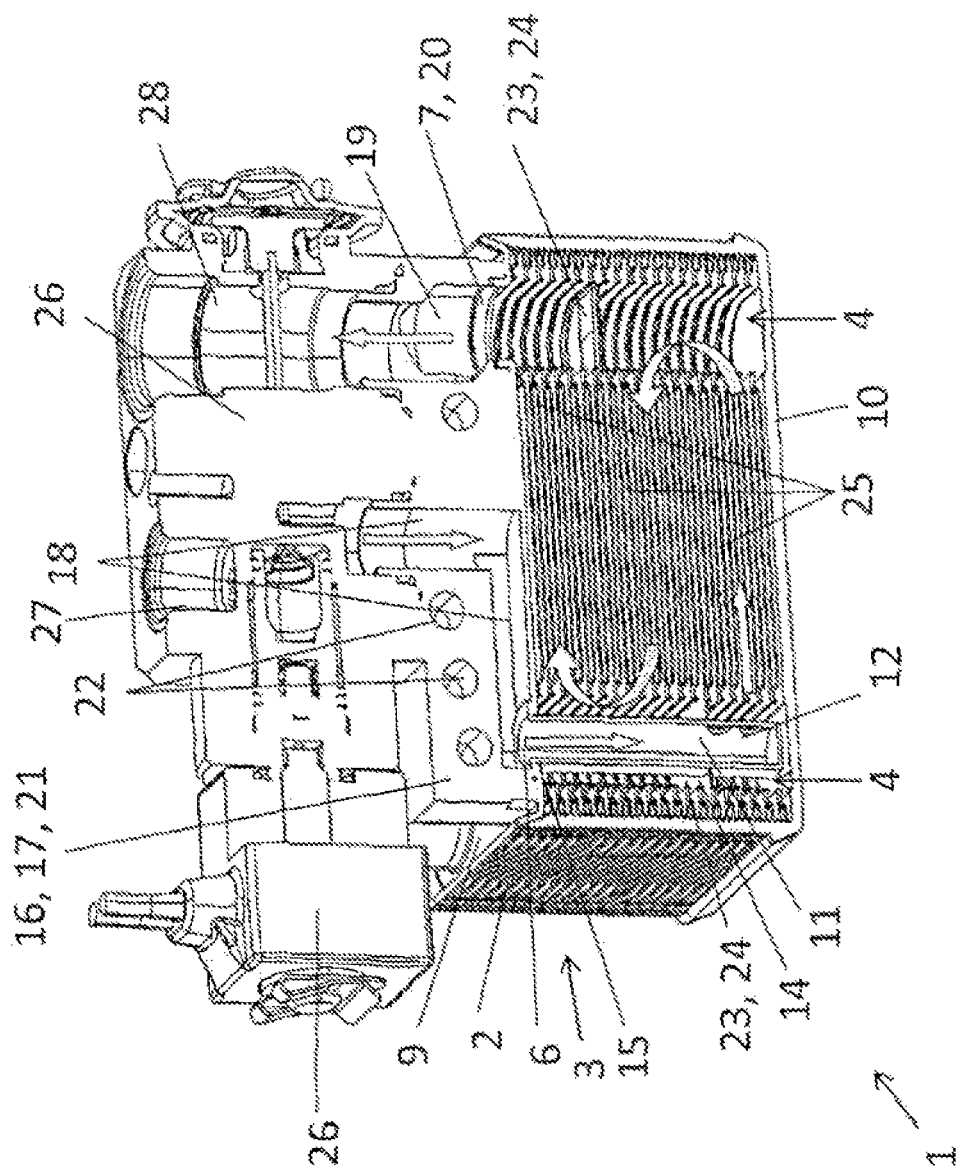
Figure 3:
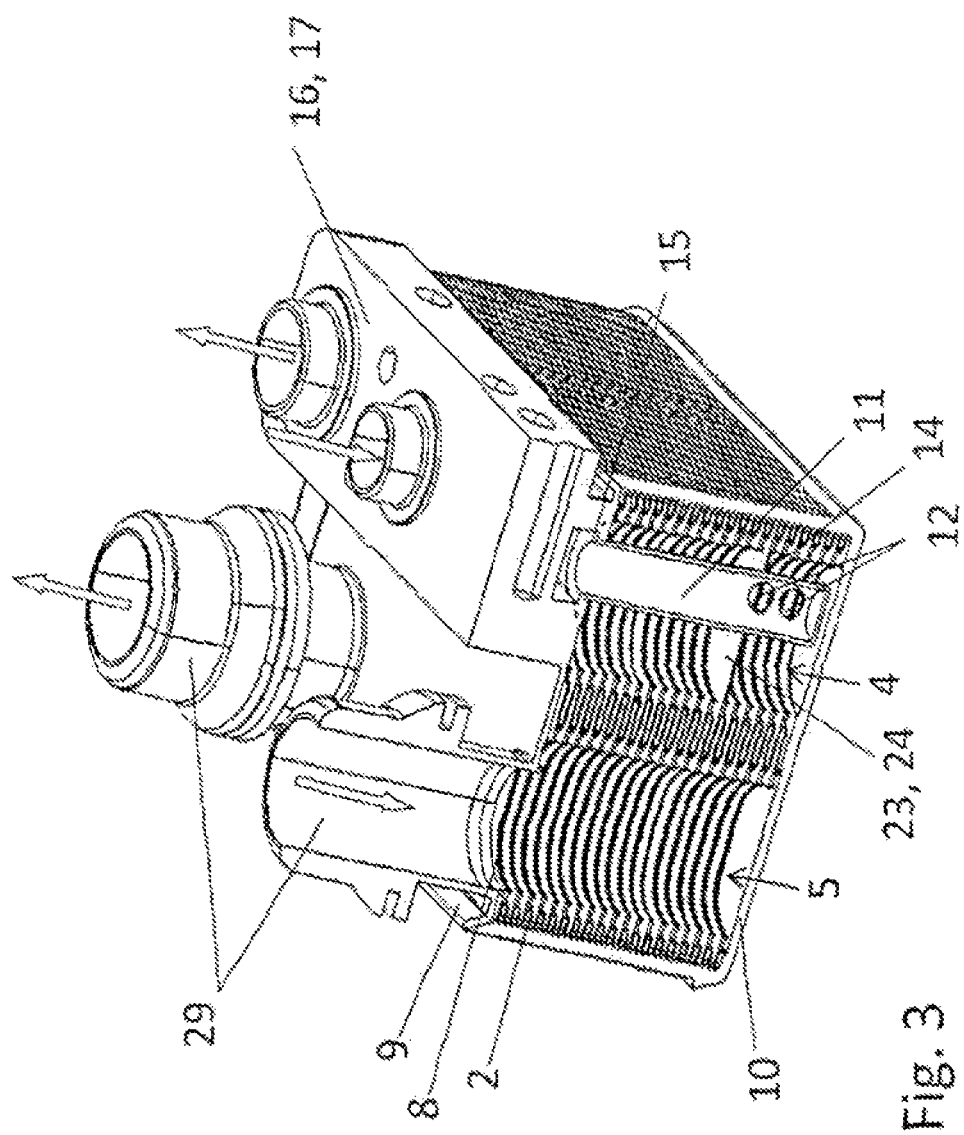
Figure 4:
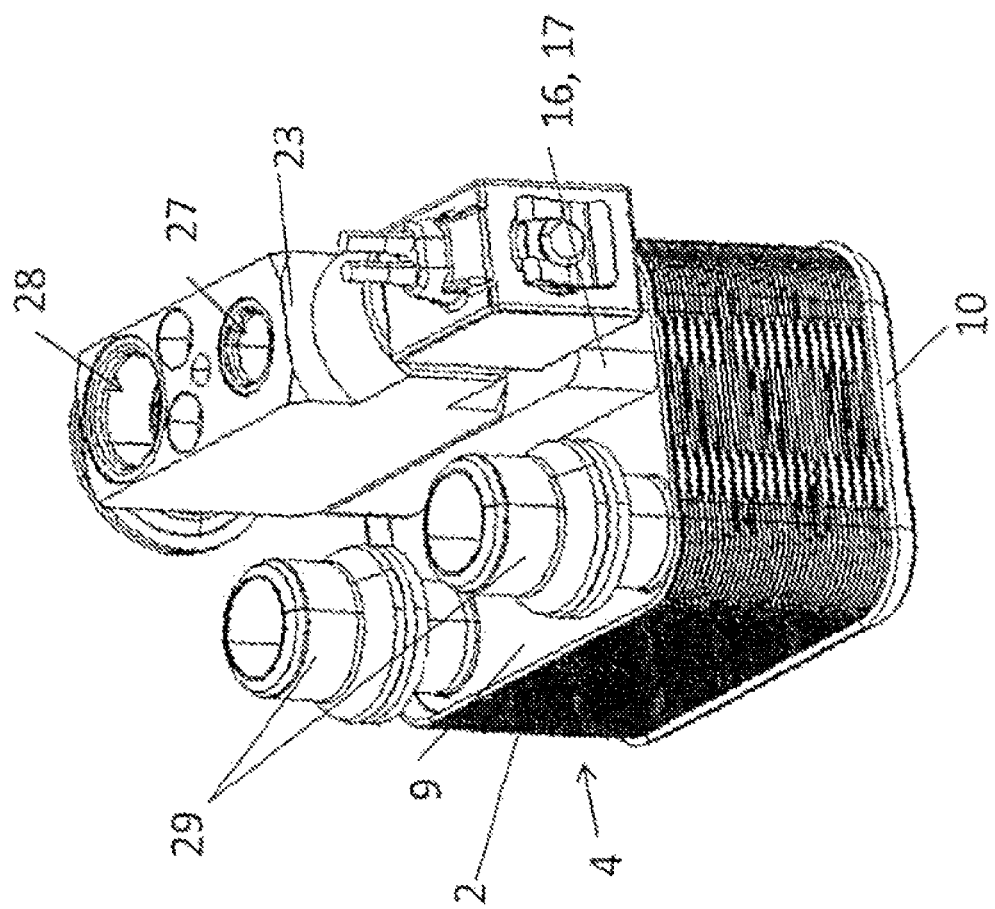

Exemplary embodiments of the invention will be described in more detail below with reference to the appended drawings, in which:

FIG. 1 is a perspective sectional view of a heat exchanger in a first exemplary embodiment with an expansion valve, FIG. 2 is a perspective sectional view of the heat exchanger in a second exemplary embodiment with the expansion valve, FIG. 3 is a further perspective sectional view of the heat exchanger as per FIG. 2 without an expansion valve, FIG. 4 is a further perspective view of the heat exchanger as per FIG. 2 with an expansion valve, FIG. 5 is a mounting or connection according to a first exemplary embodiment between an immersion tube and a diverting plate, FIG. 6 is a mounting or connection according to a second exemplary embodiment between the immersion tube and the diverting plate, FIG. 7 is a mounting or connection according to a third exemplary embodiment between the immersion tube and the diverting plate, FIG. 8 is a mounting or connection according to a fourth exemplary embodiment between the immersion tube and the diverting plate, FIG. 9 is a mounting or connection according to a fifth exemplary embodiment between the immersion tube and the diverting plate, and FIG. 10 is a mounting or connection according to a sixth exemplary embodiment between the immersion tube and the diverting plate.

The heat exchanger 1 or chiller 1 illustrated in FIG. 1 in a side view is used in a system (not illustrated) for heating and/or cooling a battery of a motor vehicle in the form of a hybrid or electric vehicle. Here, the heat exchanger 1 is in the form of a heat exchanger 1 of plate-type construction. A multiplicity of stacking plates 2 with first and second apertures 4, 5 or openings 4, 5 are stacked one on top of the other to form a stack 3. As a result, a first fluid duct and a second fluid duct for conducting a fluid are formed between the stacking plates 2. In this way, an exchange of heat is possible from the first fluid to the second fluid or vice versa. The first apertures 4 likewise form the first fluid duct through which the first fluid flows into and out of the first fluid duct between the stacking plates 2. This also applies analogously to the second fluid duct and the second apertures 5. The upper end of the stack 3 of stacking plates 2 in the illustration of FIG. 1 is closed off at the top by a cover panel 9, and the stack 3 is closed off at the bottom by a base panel 10. Here, the cover panel 9 and base panel 10 have a greater thickness than the stacking plates 2. The cover panel 9 also has first apertures or openings, and second apertures 5 or openings 5, for conducting the first and second fluid. Here, the two first apertures 4 are formed exclusively on the cover panel 9 and not on the base panel 10, such that the two first apertures 4 are formed on one side of the stack 3. A first aperture 4 forms a first inlet opening 6 for the first fluid, in this case refrigerant, and a further first aperture 4 on the cover panel 9 forms a first outlet opening 7 for the refrigerant. Analogously, a second inlet opening 8 (FIG. 3) and a second outlet opening (not illustrated) on the cover panel 9 form the inlet and outlet openings 8 for the second fluid. The second fluid is conducted through the second fluid duct between the stacking plates 2 in only one flow direction through the second fluid duct, without being diverted and in a non-meandering manner.

Here, the first aperture 4 on the cover panel 9, which first aperture forms a first inlet opening 6 for the refrigerant, has an immersion tube 11. Here, the immersion tube 11 is cohesively fastened to the cover panel 9 by means of a soldered connection in the region of the first aperture 4 or of the first inlet opening 6. Here, said fastening of the immersion tube 11 to the cover panel 9 constitutes a fixed mounting 15 for the immersion tube 11. The refrigerant is conducted in opposite directions through the first fluid duct between the stacking plates 2 in a meandering fashion through three portions 25 of the first flow duct between the stacking plates 2. For this purpose, it is necessary for the first apertures 4 of the stacking plates 2 to be closed off at two locations. For this purpose, two stacking plates 2 have no first apertures 4 and thus form a diverting plate 24 as a diverting device 23. In FIG. 1, at the left-hand first apertures 4 illustrated in FIG. 1, a lower diverting plate 24 is provided which divides the left-hand first apertures 4, and at the right-hand first apertures 4, an upper diverting plate 24 is provided which, at one location, divides the chamber of the first fluid duct formed by the right-hand first apertures 4. Here, the lower diverting plate 24 has an opening through which the immersion tube 11 is guided. Here, a lower end of the immersion tube 11 has an axial flow opening 12 through which the liquid refrigerant introduced at the first inlet opening 6 flows out of the immersion tube 11 into the first fluid duct below the diverting plate. After flowing out of the flow opening 12, the refrigerant flows from left to right through the lowermost portion 25, is subsequently diverted in the first fluid duct in the region of the right-hand first apertures 4, and subsequently flows in the opposite direction through the middle portion 25 of the first fluid duct. Subsequently, the refrigerant is diverted again at the left-hand first apertures 4 above the diverting plate 24 and outside the immersion tube 11, and flows through the uppermost portion 25 and subsequently out of the uppermost portion 25 into the first fluid duct above the upper diverting plate 24 into the right-hand first apertures 4, and subsequently flows out of the heat exchanger 1, or the stack 3 of stacking plates 2, again through the first outlet opening 7. Here, the connection between the immersion tube 11 and the diverting plate 24 is in the form of a loose mounting 14, such that as a result, the immersion tube 11 is movable relative to the diverting plate 24, as a loose mounting 14, in the direction of a longitudinal axis 13 of the immersion tube 11. Here, the flow opening 12 of the immersion tube 11 is formed axially with respect to the longitudinal axis 13 of the immersion tube 11.

A connecting flange 16 or a connecting block 17 composed of metal is fastened to the cover panel 9 by means of a soldered connection. Here, the connecting flange 16 has an inflow duct 18 for conducting the refrigerant into the heat exchanger 1 and an outflow duct 19 for conducting the refrigerant out of the heat exchanger 1. Here, the outflow duct 19 is formed in alignment with the first outlet opening 7, and the inflow duct 18 has two bends or curves as diverting points of approximately 90°. Furthermore, a connecting flange outlet opening 20 at the end of the outflow duct 19 is formed in alignment with the first outlet opening 7 on a stacking plate 7 or on the cover panel 9. Here, the first outlet opening 7 also constitutes a first right-hand aperture 4. The connecting block 17 is also a fixing device for fastening the heat exchanger 1 to other components, for example a bodyshell of a motor vehicle (not illustrated). For this purpose, the fixing device 21 or the connecting flange 16 has multiple bores 22. Through said bores 22, a mechanical connection can be produced between the fixing device 21 and another component by means of screws or bolts (not illustrated) in the bores 20. By contrast to the cohesive soldered connection between the connecting block 17 and the cover panel 9, the connecting flange 16 may also be connected in a fluid-tight manner to the cover panel 9 by means of a screw connection (not illustrated) and at least one O-ring seal.

A thermal expansion valve 26 with an inflow duct 27 and an outflow duct 28 is fastened to the connecting flange 16. Here, the expansion valve 26 is connected to the connecting flange 16 in a fluid-tight manner, for example by means of a cohesive joining connection, for example a laser or plasma weld, a soldered connection or by means of some other joining process such as adhesive bonding or deformation. By contrast to this, the expansion valve 26 may also be fastened to the connecting flange 16 by means of a screw or rivet connection, and a fluid-tight connection between the expansion valve 26 and the connecting flange 16 is produced by means of at least one O-ring seal (not illustrated). Here, the inflow duct 18 of the connecting flange 16 opens into the inflow duct 27 of the expansion valve 26 in an aligned manner, and the outflow duct 19 of the connecting flange 16 opens into the outflow duct 28 of the thermal expansion valve 26 in an aligned manner.

FIGS. 2 to 4 illustrate a second exemplary embodiment of the heat exchanger 1. Below, substantially only the differences in relation to the first exemplary embodiment as per FIG. 1 will be described. The immersion tube 11 has two radial flow openings 12. Through the two radial flow openings 12 with respect to the longitudinal axis 13, the refrigerant flows into the first fluid duct below the diverting plate 29 at the left-hand first apertures 4. In FIG. 3, there are also illustrated two coolant connectors 29 for conducting the coolant in and out, the coolant being for example water with an antifreeze agent. At the coolant connectors 29, second apertures 5 are formed in alignment with the coolant connector 24 on the stacked plates 2. Here, FIG. 3 illustrates those second apertures 5 through which the coolant is conducted into the heat exchanger 1.

In a further exemplary embodiment (not illustrated) of the heat exchanger 1 with the thermal expansion valve 26, the expansion valve 26 is fastened to the cover panel 9 without the connecting flange 16, for example by means of a soldered connection. Here, the first outlet opening 7 on the stack 3 of stacked plates 2 with the cover panel 9 and the base panel 10 as the remainder of the heat exchanger 1 is formed in alignment with the outflow duct 28 of the expansion valve 26. The liquid refrigerant introduced into the expansion valve 26 through the inflow duct 27 is, after flowing through the inflow duct 27, conducted through an additional refrigerant tube from the end of the inflow duct 27 to the first inlet opening 6 or to the immersion tube 11. Said additional refrigerant tube, as a separate component, has a small size or extent because no diversion of the refrigerant from one side to another side of the remainder of the heat exchanger 1 is necessary, and said additional refrigerant tube corresponds in terms of its function to the inflow duct 18 of the connecting flange 16 according to the first and second exemplary embodiments.

FIGS. 5 to 8 show various exemplary embodiments for the connection and/or mounting of the immersion tube 11 at the opening of the diverting plate 24. The diverting plate 24 has, in the region of the opening for the leadthrough of the immersion tube 11 and/or for the conducting of the refrigerant through the diverting plate 24, an upward indentation 30, as per the illustration in FIG. 5, a downward indentation 30, as per the illustration in FIG. 6, in each case at the outside as per the illustration in FIGS. 5 and 6, or a downward indentation 30 at the inside in the region of the flow opening 12 of the immersion tube 11, as per the illustration in FIG. 7. Furthermore, the immersion tube 11 may also be formed with an upward indentation 30 as per the illustration in FIG. 8, and here, latching 31 is generated between the diverting plate 24 and the immersion tube 11. In the exemplary embodiment illustrated in FIG. 9, the immersion tube has a step 32 in the region of the end at the flow opening 12, and by means of the step 32 and a sealing ring 33 arranged between the step 32 and the diverting plate 24, the immersion tube 11 rests directly via the sealing ring 33 on the diverting plate 24. As per the illustration in FIG. 10, the immersion tube 11 is soldered to the diverting plate 24 via an annular plate 34. In the case of such a soldered connection of the latter type, a fixed mounting 15 is thus provided between the immersion tube 11 and the diverting plate 24.

To cool a battery (not illustrated) of a hybrid or electric vehicle, coolant, for example water with an antifreeze agent or air, is conducted as a second fluid to the batteries. At the batteries, the coolant absorbs heat from the batteries and is subsequently conducted in a circuit to the heat exchanger 1. The coolant flows through the second fluid duct of the heat exchanger 1. Here, the refrigerant of the refrigerant circuit with a compressor (not illustrated) and a condenser likewise flows through the heat exchanger 1, that is to say through the first fluid duct of the heat exchanger 1.

Viewed as a whole, the heat exchanger 1 according to the invention as an evaporator or refrigerant evaporator is associated with significant advantages. The first inlet opening 6 and also the first outlet opening 7 for conducting the refrigerant in and out of the refrigerant evaporator 1 are in this case formed on one side of the stack 3 or of the remainder of the heat exchanger 1, because the refrigerant is conducted from the cover panel 9 to the first fluid duct by means of the immersion tube 11. In this way, with a thermal expansion valve 26 being fitted and with the refrigerant being conducted in a meandering fashion through the first fluid duct between the stacked plates 2 through three portions 25, it is no longer necessary for the refrigerant to be conducted from one side of the heat exchanger 1 to the thermal expansion valve 26 at another side of the heat exchanger 1 by means of a long refrigerant tube. In this way, installation space can be saved, and the costs for production are low.

LIST OF REFERENCE NUMERALS

1 Heat exchanger, chiller
2 Stacking plate
3 Stack of stacking plates
4 First apertures
5 Second apertures
6 First inlet opening
7 First outlet opening
8 Second inlet opening
9 Cover panel
10 Base panel
11 Immersion tube
12 Flow opening
13 Longitudinal axis of the immersion tube
14 Loose mounting
15 Fixed mounting
16 Connecting flange
17 Connecting block
18 Inflow duct on connecting flange
19 Outflow duct on connecting flange
20 Connecting flange outlet opening
21 Fixing device for fastening the heat exchanger
22 Bores in fixing device
23 Diverting device
24 Diverting plate
25 Portion of the first fluid duct
26 Expansion valve
27 Inflow duct on expansion valve
28 Outflow duct on expansion valve
29 Coolant connector
30 Indentation on diverting plate
31 Latching on diverting plate
32 Step on immersion tube
33 Sealing ring on diverting plate
34 Annular plate on immersion tube

The invention claimed is:

1. A heat exchanger or chiller of plate-type construction, comprising:
   a multiplicity of stacking plates stacked one on top of the other, such that between the stacking plates there is formed at least a portion of a first fluid duct for a first fluid and at least a portion of a second fluid duct for a second fluid;
   the stacking plates have first apertures forming an additional portion of the first fluid duct for the supply and discharge of the first fluid;
   the stacking plates have second apertures forming an additional portion of the second fluid duct for the supply and discharge of the second fluid;
   at least one diverting device that closes off at least one first aperture such that the first fluid is conducted in opposite directions through the heat exchanger in a meandering fashion through at least two portions of the first fluid duct between the stacking plates;
   a first inlet and outlet opening for conducting the first fluid in and out;
   a second inlet and outlet opening for conducting the second fluid in and out;
   wherein the first inlet or outlet opening is formed by an immersion tube, and the first fluid can be conducted into or out of the first fluid duct through the immersion tube such that the first inlet and outlet openings are formed on the same side of the heat exchanger;
   wherein the immersion tube has at least one flow opening for conducting the first fluid into or out of the first fluid duct at the first apertures and the at least one flow opening is formed radially and/or axially with respect to a longitudinal axis of the immersion tube;

wherein the heat exchanger is in the form of an evaporator with a thermal expansion valve, and the first fluid is a refrigerant and the second fluid is a coolant.

2. The heat exchanger as claimed in claim 1, wherein the immersion tube is connected non-detachably to the heat exchanger, and/or the first fluid can, through the immersion tube, be conducted into the first fluid duct at a distance from the inlet or outlet opening.

3. The heat exchanger according to claim 2, wherein connected non-detachably is by means of soldered or adhesive connection.

4. The heat exchanger as claimed in claim 1, wherein the immersion tube extends through the at least one diverting device such that the first fluid conducted through the immersion tube can be conducted through the at least one diverting device.

5. The heat exchanger as claimed in claim 1, wherein the at least one diverting device is in the form of a diverting plate or a separate sealing element.

6. The heat exchanger as claimed in claim 1, wherein the thermal expansion valve has both an inflow duct for conducting the refrigerant in and an outflow duct for conducting the refrigerant out.

7. The heat exchanger as claimed in claim 1, wherein the expansion valve is fastened by way of a connecting flange to the remainder of the heat exchanger, and the connecting flange has both an inflow duct for conducting the refrigerant in and an outflow duct for conducting the refrigerant out.

8. The heat exchanger as claimed in claim 1, wherein a connecting flange outlet opening and the outflow duct of the connecting flange are formed in alignment with the first outlet opening on the remainder of the heat exchanger, and/or the outflow duct on the connecting flange exhibits substantially no diversion.

9. The heat exchanger as claimed in claim 1, wherein the immersion tube is fastened to the heat exchanger by means of a loose mounting and a fixed mounting, and at the loose mounting, the immersion tube is movable relative to the loose mounting in the direction of the longitudinal axis of the immersion tube, and the loose mounting is formed by the diverting plate or by a cover panel.

10. The heat exchanger as claimed in claim 1, wherein the heat exchanger comprises a fixing device for the fastening of the heat exchanger, and the fixing device is formed by the connecting flange.

11. The heat exchanger as claimed in claim 1, wherein the ratio between the flow cross-sectional area of the immersion tube and the flow cross-sectional area of a first aperture outside the immersion tube is between 0.1 and 0.6.

12. A system for a motor vehicle for heating and/or cooling a battery and a motor vehicle interior, comprising:
a coolant circuit for cooling the battery and the vehicle interior,
a refrigerant circuit having a condenser, a compressor, an expansion valve and a first evaporator for cooling the vehicle interior and a second evaporator for cooling the battery, by virtue of the second evaporator being thermally coupled, as a heat exchanger, to the coolant circuit, and
wherein the heat exchanger is in the form of a heat exchanger as claimed in claim 1.

13. The heat exchanger according to claim 1, wherein the at least one diverting device which closes off at least one first aperture such that the first fluid is conducted in opposite directions through the heat exchanger in a meandering fashion through at least three portions of the first fluid duct between the stacking plates.

14. The heat exchanger according to claim 6, wherein the second fluid is water or air.

15. A motor vehicle air conditioning system, comprising:
a motor vehicle comprising:
a heat exchanger or chiller of plate-type construction, comprising:
a multiplicity of stacking plates stacked one on top of the other, such that between the stacking plates there is formed at least a portion of a first fluid duct for a first fluid and at least a portion of a second fluid duct for a second fluid;
the stacking plates have first apertures forming an additional portion of the as the first fluid duct for the supply and discharge of the first fluid;
the stacking plates have second apertures forming an additional portion of the as the second fluid duct for the supply and discharge of the second fluid;
at least one diverting device that closes off at least one first aperture such that the first fluid is conducted in opposite directions through the heat exchanger in a meandering fashion through at least two portions of the first fluid duct between the stacking plates;
a first inlet and outlet opening for conducting the first fluid in and out;
a second inlet and outlet opening for conducting the second fluid in and out;
wherein the first inlet or outlet opening is formed by an immersion tube, and the first fluid can be conducted into or out of the first fluid duct through the immersion tube such that the first inlet and outlet openings are formed on the same side of the heat exchanger;
wherein the immersion tube has at least one flow opening for conducting the first fluid into or out of the first fluid duct at the first apertures and the at least one flow opening is formed radially and/or axially with respect to a longitudinal axis of the immersion tube;
wherein the heat exchanger is in the form of an evaporator with a thermal expansion valve, and the first fluid is a refrigerant and the second fluid is a coolant.

* * * * *